(12) United States Patent
Pollmann-Retsch et al.

(10) Patent No.: US 9,144,934 B2
(45) Date of Patent: Sep. 29, 2015

(54) METHOD OF HEATING A PREFORM, A DRIVING ARRANGEMENT, A PREFORM HEATING SYSTEM AND A COMPUTER PROGRAM

(75) Inventors: Jens Pollmann-Retsch, Aachen (DE); Martin Stroesser, Aachen (DE); Pavel Pekarski, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 401 days.

(21) Appl. No.: 13/392,958

(22) PCT Filed: Sep. 8, 2010

(86) PCT No.: PCT/IB2010/054037
§ 371 (c)(1),
(2), (4) Date: Feb. 28, 2012

(87) PCT Pub. No.: WO2011/033418
PCT Pub. Date: Mar. 24, 2011

(65) Prior Publication Data
US 2012/0160822 A1    Jun. 28, 2012

(30) Foreign Application Priority Data

Sep. 15, 2009   (EP) .................................... 09170331

(51) Int. Cl.
*H05B 7/18*       (2006.01)
*H05B 6/00*       (2006.01)
*B29C 49/64*      (2006.01)
*B29C 35/08*      (2006.01)
*B29K 67/00*      (2006.01)

(52) U.S. Cl.
CPC ..... *B29C 49/6454* (2013.01); *B29C 2035/0838* (2013.01); *B29K 2067/00* (2013.01)

(58) Field of Classification Search
CPC ................ B29C 49/6454; B29C 49/06; B29C 2035/0822; B29C 2035/0838
USPC .......... 219/121.62, 121.65, 383; 264/454, 458
See application file for complete search history.

(56) References Cited

U.S. PATENT DOCUMENTS 2,789,312 A * 4/1957 Borer ............................ 425/526
4,943,721 A * 7/1990 Vidrine, Jr. .................... 850/63

(Continued)

FOREIGN PATENT DOCUMENTS

EP      0472384 A2    2/1992
FR      2878185 A1    5/2006

(Continued)

*Primary Examiner* — Tu B Hoang
*Assistant Examiner* — Alba Rosario-Aponte

(57) ABSTRACT

The invention describes a method of heating a preform (1) characterized by a radius (R), a material thickness (t), and a material absorption spectrum, which method comprises the steps of selecting, depending on a desired temperature profile, a desired effective absorption coefficient for the preform (1) on the basis of the preform radius (R) and material thickness (t); generating a laser radiation beam (L) comprising radiation with a wavelength spectrum compiled on the basis of absorption coefficients of the absorption spectrum to satisfy the effective absorption coefficient and directing the laser radiation beam (L) at the preform (1) to heat the preform (1). The invention further describes a driving arrangement (7) for controlling a laser radiation generating unit (9) of a preform heating system (10), a preform heating system (10), and a computer program.

9 Claims, 7 Drawing Sheets

(56) References Cited

U.S. PATENT DOCUMENTS

| | | | |
|---|---|---|---|
| 5,032,700 A | 7/1991 | Sugiyama et al. | |
| 5,256,341 A * | 10/1993 | Denis et al. | 264/492 |
| 5,312,572 A * | 5/1994 | Horwege | 264/521 |
| 5,925,710 A | 7/1999 | Wu et al. | |
| 6,503,586 B1 * | 1/2003 | Wu et al. | 428/35.7 |
| 7,425,296 B2 | 9/2008 | Chchran et al. | |
| 2005/0041848 A1 * | 2/2005 | Thomas et al. | 382/141 |
| 2005/0193690 A1 * | 9/2005 | Schoeneck | 53/557 |
| 2007/0096352 A1 * | 5/2007 | Cochran et al. | 264/40.6 |
| 2008/0305203 A1 | 12/2008 | Plantamura | |
| 2011/0006462 A1 * | 1/2011 | Cochran et al. | 264/454 |
| 2011/0044670 A1 * | 2/2011 | Cochran et al. | 392/407 |

FOREIGN PATENT DOCUMENTS

| | | |
|---|---|---|
| WO | 2004048463 A1 | 6/2004 |
| WO | 2006069261 A2 | 6/2006 |
| WO | 2007149221 A2 | 12/2007 |

* cited by examiner

METHOD OF HEATING A PREFORM, A DRIVING ARRANGEMENT, A PREFORM HEATING SYSTEM AND A COMPUTER PROGRAM

FIELD OF THE INVENTION

The invention describes a method of heating a preform. The invention also describes a driving arrangement, a preform heating system and a computer program for heating a preform.

BACKGROUND OF THE INVENTION

Nowadays, the majority of beverage containers are lightweight plastic bottles of a material such as PET (polyethylene terephthalate), manufactured in a two-step process. In a first step, so-called hollow "preforms" are created from the raw material, e.g. by a slow, high-temperature extrusion process. In a second step the 'walls' of these hollow preforms are heated again—this time to a temperature below their re-crystallization point, i.e. below about 130° C.—and then formed into the desired bottle-shapes via blow-moulding.

In most state of the art preform heating ovens, this heating is carried out using halogen lamps, for which a significant portion of the broad emission spectrum lies in the infrared region. During the heating process, heat energy is 'deposited' in the preform material. The infrared heating technique, while technically well-developed, has the drawback of limited energy efficiency. One reason for the poor energy efficiency is that the radiation emitted by the halogen lamps cannot effectively be directed or focused. The main reason, however, is the poor matching of the emission spectrum of the halogen lamps to the absorption spectrum of the preform material, which results in absorption of energy in inappropriate regions of the preform, for example in its outer surface. This results in higher temperatures in some regions of the preform wall, while other regions are insufficiently heated. For example the outside surface of the preform may become very hot while the inside surface is insufficiently heated. Furthermore, the distribution of deposited energy inside the preform wall does not necessarily result in the same distribution of temperatures on account of the thermal conductivity of the material. Such temperature gradients or hot spots make it difficult to ensure an even quality of the subsequent blow-moulding stage, and may even result in damage to the outer surface of the preform. Therefore, some prior art processes even resort to an additional cooling of the preforms during the heating-process (for example by forced-air cooling); a measure which is obviously costly and inefficient from the point of view of energy consumption, and therefore undesirable. Alternatively, in prior art ovens, an unwanted temperature gradient may be dealt with by "equilibration phases", i.e. time-delays during which thermal conduction inside the preform material should lead to an equalization of the temperatures in the preform wall. These equilibration phases typically take several seconds (up to ten). However, including these phases into the heating process means that the total process time is lengthened, thereby increasing the overall cost of the preform heating process.

SUMMARY OF THE INVENTION

Therefore, it is an object of the invention to provide a more economical and effective preform heating process which avoids the problems mentioned above.

The object of the invention is achieved by the method of heating a preform according to claim 1 and by a driving arrangement according to claim 10.

According to the invention, the method of heating a preform—characterized by a radius, a material thickness, and a preform material absorption spectrum—comprises the steps of selecting a desired effective absorption coefficient for the preform on the basis of the desired temperature profile, the preform radius, and the material thickness, and generating a laser radiation beam with a wavelength spectrum compiled on the basis of the absorption coefficients of the absorption spectrum, i.e. on the basis of at least one absorption coefficient of the absorption spectrum, to satisfy the effective absorption coefficient. The method further comprises the step of directing the laser radiation beam at the preform to heat the preform. Here, a preform is to be understood to be any "preformed" object or workpiece, preferably cylindrical in shape and hollow, which is to be heated in order to be softened for a subsequent blow-moulding step. An example of such a preform might be an essentially cylindrical hollow PET element from which a beverage container is to be made. Also, the "effective absorption coefficient" may be regarded as a function of absorption coefficients of the absorption spectrum of the preform material at specific wavelengths of light.

The term "wavelength spectrum" of the laser radiation is to be understood to mean the "set" of radiation wavelengths of the laser radiation beam with their relative intensities, whether these are discrete wavelengths, or a wavelength range covering a continuum in the range. As the wavelength of a photon may be equally described by its energy or frequency, the terms "energy spectrum" or "frequency spectrum" of the laser radiation can be regarded as equivalent to the term "wavelength spectrum". Therefore, as will be explained below, a wavelength spectrum may, for example, be 'compiled' by choosing laser radiation sources with appropriate wavelengths or wavelength ranges and mixing or superimposing the radiation from these laser radiation sources at suitable levels of intensity.

The effective absorption coefficient is to be understood to be equivalent to the actual absorption (for example in a preform) for an incoming radiation spectrum, calculated for all pertinent wavelengths of radiation. The effective absorption coefficient $\alpha_{\mathit{eff}}$ for a given radiation spectrum can be expressed using the following equation:

$$\alpha_{\mathit{eff}} = -\frac{1}{t} \cdot \ln\left[\sum_\lambda w_\lambda \cdot \exp(-\alpha_\lambda \cdot t)\right] \qquad (1)$$

where t is the material thickness (in this case the wall thickness of the preform), $\lambda$ is a wavelength of a laser radiation component, $\alpha_\lambda$ is the known absorption coefficient for that material at that wavelength (obtained, for example, from an absorption spectrum for that material), and $w_\lambda$ is the weighting factor for that wavelength. In equation (1), absorption at discrete wavelengths is assumed, and the effective absorption coefficient is expressed as a sum. Evidently, the absorption could equally well occur over a wavelength continuum, in which case the effective absorption coefficient would be expressed as a corresponding integral. In either case, the total of all weighting factors together should give unity or 1.0.

By appropriate choice of the wavelengths and/or the weighting factors for each wavelength to be used, equation (1) can be used in reverse i.e. to 'compile' or 'assemble' a radiation spectrum that leads to an effective absorption coefficient with a desired value, for example as determined by a certain desired distribution of absorbed energy.

The 'resolution' of the effective absorption coefficient may depend to some extent on the capabilities of the laser radiation sources available, and how well these can be matched to the absorption coefficients of the material being heated. Obviously, when using a laser radiation source that comprises many differently tuned individual laser radiation sources, radiation can be generated at wavelengths resulting in an appropriate absorption in the material, so that the desired effective absorption coefficient $\alpha_{eff}$ can be reproduced to a high degree of accuracy. However, even in systems with only a limited number of available wavelengths, the degree of freedom offered by the weighting factors may be put to good effect to obtain a close approximation of the desired value of the effective absorption coefficient $\alpha_{eff}$.

An advantage of the method according to the invention is that the energy contained in the laser radiation beam and applied to the preform will be optimally deposited, i.e. absorbed by the preform. Compared to prior art heating techniques, in the method according to the invention, the energy is more evenly, preferably essentially evenly, deposited throughout the preform material. Since the effective absorption coefficient for a preform is chosen on the basis of that preform's radius and material thickness, the effective absorption coefficient exactly suits that type of preform. Using this effective absorption coefficient as a target or goal, it is then possible to 'compile' a laser radiation beam comprising a laser radiation wavelength spectrum, which laser radiation beam, when directed at the preform, will heat the preform according to the effective absorption coefficient.

Surprisingly, it has been observed that the effective absorption coefficient necessary to achieve a desired temperature profile in the preform wall does not necessarily coincide with the values of greatest absorption recorded in the absorption spectrum for that preform material.

Therefore, the effective absorption coefficient (and further parameters) may preferably be chosen such that the energy absorption density is essentially uniform throughout the body of the preform. This allows a more energy-efficient heating process compared to prior art approaches, in which an excess of infrared energy is radiated in the direction of the preform but wasted to a large extent. Also, using the method according to the invention, a local overheating in regions of the preform is avoided, so that the inefficient and costly cooling required by prior art approaches is not needed.

The driving arrangement according to the invention for controlling a laser radiation generating unit of a preform heating system comprises an input interface for obtaining preform geometry parameters, a preform absorption spectrum, and a desired temperature profile or temperature gradient for the preform, and a selection arrangement for selecting an effective absorption coefficient on the basis of the preform geometry parameters and the desired temperature profile, and a laser parameter compiler module for compiling a laser wavelength spectrum on the basis of corresponding absorption coefficients of the preform material to satisfy the effective absorption coefficient, and for selecting a laser beam width for the laser radiation beam on the basis of the desired relative effective absorption coefficient. The driving arrangement also comprises an output interface for providing a laser radiation generating unit with control signals pertaining to the chosen laser radiation wavelength spectrum and the laser beam width.

The dependent claims and the subsequent description disclose particularly advantageous embodiments and features of the invention.

As the effective absorption coefficient depends on the radius of the perform, the effective absorption coefficient is preferably derived in a two-step manner: in a first step, a desired relative effective absorption coefficient for the preform is selected on the basis of the desired temperature profile, the preform radius, and the material thickness. In a second step, the effective absorption coefficient is subsequently derived from the relative effective absorption coefficient.

The term "relative effective absorption coefficient" ($\alpha_{eff} \cdot R$) is to be understood to be the effective absorption coefficient $\alpha_{eff}$ multiplied by the radius R of the preform. It is a value that gives an indication of the manner in which heat energy is absorbed by the preform. A set of relative effective absorption coefficient values can be determined independently of the preform material, and may be visualized as a region of points in a point space bounded by a range given by the ratio of preform thickness to preform radius; and by the ratio of a laser radiation beam width to the preform radius. This will be explained later in greater detail with the aid of the diagrams.

Accordingly, the selection arrangement of the driving arrangement preferably comprises a selection module for selecting a relative effective absorption coefficient on the basis of the preform geometry parameters and the desired temperature profile, and a derivation module for deriving the effective absorption coefficient from the relative effective absorption coefficient.

Although the relative effective absorption coefficient can be chosen from a wide range encompassed by extremes, for example a laser beam that is extremely narrow or extremely wide, or a preform wall that is extremely thin or extremely thick relative to the radius, generally a desirable relative effective absorption coefficient will lie within a smaller realistic range. According to the invention, therefore, the method of heating a preform comprises generating a laser radiation beam comprising laser radiation with a wavelength spectrum compiled (on the basis of one or more absorption coefficients of the absorption spectrum of the preform material) to satisfy an effective absorption coefficient, such that the laser radiation beam, when directed at the preform, heats the preform according to a desired relative effective absorption coefficient in the range 1.0 to 4.0, more preferably in the range 2.0 to 3.5, and most preferably in the range 2.5 to 3.0. For the usual types of preforms then, with walls that are neither extremely thick nor extremely thin, a useful relative effective absorption coefficient can be chosen for a desired temperature profile to be obtained using a practicable laser beam width. Preferably, if the desired temperature profile can be achieved with the chosen relative effective absorption coefficient, this may be chosen from the upper range given, since observations have shown that such value from that range, when used as a basis for compiling the laser beam, results in a very favourable energy absorption density throughout the preform during heating. The effective absorption coefficient can be obtained on the basis of laser radiation of just a single wavelength; however it may be more beneficial to use several laser wavelengths to compile a suitable spectrum that satisfies the desired effective absorption coefficient, since the use of several lasers allows a more flexible adaptation of the radiation spectrum to changing requirements, for example changing from one preform material to another, or changing from one preform size to another, etc.

The width of a laser radiation beam can extend from a near point (when the laser beam is generated as a narrow beam) to a wide line (when, e.g., the laser beam is fanned out). The intensity of the laser radiation arriving at the destination (in this case, a preform) will depend on the effective width of the laser beam. Usually, a wide beam has less sharply defined edges than a narrow beam. Typically, the irradiance of the laser radiation is strongest in the centre of the beam, and drops off towards the outer edges of the beam. The 'useful' width of a laser beam can be defined in a number of ways, for example by using the "full width at half maximum" (FWHM), i.e. the width of the beam between two points at which the irradiance of the beam is at half its maximum.

During development of the inventive method, it has been observed that the width of the laser beam directed at the preform also influences the heating process. A narrow point-like beam of radiation may heat a 'spot' area of the preform, while a wide fan-shaped beam of radiation may heat a 'strip' area of the preform. Furthermore, the laser beam width also influences the temperature profile inside the preform wall: with a narrow beam, it is easier to achieve a higher temperature at the inside of the preform wall than at the outside, while it is very much more difficult to obtain such a temperature gradient using a wide laser beam. Therefore, in the method according to the invention, a beam width for the laser radiation beam is preferably determined such that the value of beam width divided by the value of preform radius is less than or equal to 0.5, more preferably less than or equal to 0.1, and the step of generating laser radiation to give the laser radiation beam comprises shaping the laser radiation beam according to the determined beam width. Choosing a value of relative beam width in that range allows a favourably high choice of relative effective absorption coefficient, as described above.

Usually, because of the complex electronics involved, a laser radiation source will be at a fixed location relative to the preforms which may be transported to pass by the laser radiation source at an appropriate velocity. Usually, the preforms are held vertically and moved horizontally through an oven, but it is clear that an oven can be constructed in which the preforms can be held and transported in any suitable manner. Since the preforms are generally moved past the laser radiation sources, these evidently cannot entirely surround the preforms. To ensure even heating, therefore, a preform is preferably rotated about a longitudinal axis whereby the orientation of the longitudinal axis is essentially transverse to a major axis of the incoming laser radiation beam. For example, the laser radiation beam may be directed horizontally at the preforms passing by, and the preforms may be rotated about a vertical axis so that a major axis of the laser radiation beam strikes the preform essentially perpendicularly to the preform surface.

A certain 'temperature profile' can be obtained with the chosen spectral composition and shape of the laser beam. For example, it has been observed that a particular preform may exhibit a higher temperature on the outside than on the inside when heated using a 'wide' beam and when the laser beam spectrum has been compiled to satisfy a relative effective absorption coefficient with a value from the upper range given above, for example a value of about 4.0. That same preform may exhibit a higher inside temperature when heated using a narrow beam and when the laser beam spectrum has been compiled in order to create a relative effective absorption coefficient with a value from the lower range specified above, e.g. a value close to 2.0. In a particularly preferred embodiment of the invention, therefore, the desired relative effective absorption coefficient is chosen on the basis of a specific temperature gradient to be achieved, during heating, between an outer region and an inner region of the preform. For example, a controller of a preform heating system may decide that the preforms are best heated such that the insides of the preform are hotter than the outsides. Using this as a performance target, and knowing the preform geometry, the controller can choose a corresponding relative effective absorption coefficient and an appropriate beam width so that the laser radiation beam is compiled with a suitable wavelength spectrum and regulated accordingly.

While the compiled laser radiation results in a temperature gradient satisfying the desired temperature profile, for example 'slightly hotter on the inside than on the outside', the absolute values of temperature can be influenced by the irradiation duration. Exposing the preform to the laser radiation for a longer duration will result in higher temperatures throughout the preform, while the overall temperature gradient continues to satisfy the desired temperature profile.

Using the method according to the invention, a higher temperature can be reached on the inside of the preform than on the outside, so that a subsequent blow-moulding step can be performed, and so that the quality of the finished product—for example beverage containers—is satisfactorily high. Furthermore, a very even heating of the preform body can also be achieved, in contrast to the prior art techniques which often result in a too hot outer surface of the preform.

However, depending on, for example, the material of the preform, the occurrence of total internal reflection in the wall of the preform may lead to a situation in which the temperature at an inner surface or region of the preform is too high.

In the following, a number of approaches are described with which the temperature at the inside of the preform can be 'fine-tuned'. In a preferred embodiment of the invention, the temperature of the inner region of the preform is regulated by means of a refractive element with a specific refractive index, which refractive element is located in a cavity of the preform. Such a refractive element may simply be a rod or similar object inserted into the cavity of the preform, and shaped in such a way that it neatly fits the cavity. Preferably, the material of the refractive element is chosen such that the refractive index of the refractive element closely matches that of the preform. For example, the refractive element can be of the same material as the preform or of a material very similar to that of the preform. Then, any radiation passing through the preform will no longer undergo total internal reflection at the inner surface of the preform, but will pass through the refractive element and continue, on the other side, to emerge through the body of the preform. In this way, it is ensured that an undesirable excess of energy is not deposited at the inner regions of the preform. The refractive element can be a solid, but could equally well be a liquid such as a suitable oil, or even water, depending on the desired refractive properties.

Use of a refractive element located in the preform cavity can effectively distribute the laser radiation energy. Depending on the preform material, preform geometry, and choice of laser radiation source, however, it may be desirable to 'dispose' of some excess portion of the laser radiation. Therefore, in a further preferred embodiment of the invention, the temperature of the inner region of the preform can be regulated by means of a thermal absorber positioned in a cavity of the preform, which thermal absorber absorbs a portion of the laser radiation energy. In this way, the excess energy is not simply redirected to another region of the preform, but can be partially or completely 'removed'. The material of the absorber can be chosen on the basis of its absorptive properties, for example to absorb laser radiation of all wavelengths used, or some or most of the wavelength used. The thermal absorber can be a solid, a liquid, or any suitable state. For example, the preforms can be suspended with their open ends facing upward on their path through the oven, and the thermal absorber can simply be water poured into the cavity and later poured out again before the preform is shaped by blow-moulding.

The preforms are usually rotated about an axis, as described above, so that the heat energy of the laser radiation is effectively distributed throughout the body of the preform. In a further preferred embodiment of the invention, the thermal absorber comprises a half-cylinder of energy-absorbing material, which half-cylinder is essentially stationary relative to the preform.

The driving arrangement is preferably equipped with a memory for storing information pertaining to relative effective absorption coefficients for different preform geometries, laser beam widths, and resulting temperature profiles. Such a memory can store the information in the form of look-up tables (LUTs) or graphs, as appropriate. For example, relative effective absorption coefficient data can be gathered for a variety of preform geometries, laser beam widths, and temperature gradients, and stored as a collection of points. At a later stage, using a different preform geometry, a relative effective absorption coefficient can be determined by interpolation between suitable points of the previously gathered data. Naturally, the data stored in the memory could be updated or augmented by new data points at any time.

A preform heating system according to the invention, in particular a bottle-blowing apparatus for heating preforms, comprises a laser radiation generating unit for generating a laser radiation beam comprising laser radiation components at a number of wavelengths, and a driving arrangement as described above for controlling the laser radiation generating unit, and a beam controller for directing the laser radiation beam at the preform to heat the preform.

Any suitable laser radiation source could be used to generate the required beam of laser radiation. Preferably, the laser radiation beam should include several different wavelengths or wavelength ranges at variable intensities, so that a variable wavelength spectrum can be compiled to suit the type of preform being heated. A suitable laser radiation generating unit could comprise, for example, a plurality of semiconductor lasers, which are compact and can be arranged over a relatively small area (compared to infrared halogen lamps, which are quite bulky) suitable for irradiating the preforms. Furthermore, semiconductor lasers are relatively economical. A particularly suitable type of semiconductor laser is a vertical cavity surface emitting laser (VCSEL), since a VCSEL can be tuned to deliver radiation of a certain wavelength by appropriate choice of the active medium and the reflector layers, as will be known to the skilled person. Therefore, the laser radiation generating unit of a preform heating system according to the invention preferably comprises a plurality of VCSELs, for example a set of VCSELs each covering a range of wavelengths in different regions of the light spectrum, in particular in the infra-red range of the spectrum. With such a bank of VCSELS, it is particularly straightforward to 'mix' or 'compile' a wavelength spectrum with wavelengths matched to a certain preform, so that the preform can be optimally heated. The wavelength spectrum compiled for such a laser radiation source can comprise discrete wavelengths, or a continuum of wavelengths, as appropriate.

For certain types of preform, it may be sufficient to generate radiation within a narrow range of wavelengths for a 'fine-tuning' of the heating process, while a basic heating is carried out with an alternative source of heat. Therefore, in a further preferred embodiment of the invention, the preform heating system, in addition to the laser radiation generating unit described above, comprises an infrared radiation source such as a number of halogen lamps.

In a further aspect of the present invention a computer program for heating a preform is presented, wherein the computer program comprises program code means for causing a preform heating system to carry out the steps of a method of heating a preform, when the computer program is run on a computer controlling the preform heating system.

It shall be understood that the preform heating system, the method of heating a preform and the computer program have similar and/or identical preferred embodiments, in particular, as defined in the dependent claims.

It shall be understood that a preferred embodiment of the invention can also be any combination of the dependent claims with the respective independent claim.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
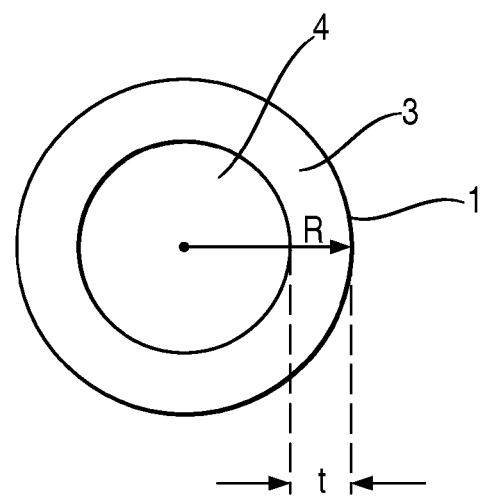
FIG. 1 shows a simplified transverse cross section and a simplified longitudinal cross section through a preform.
Figure 1:
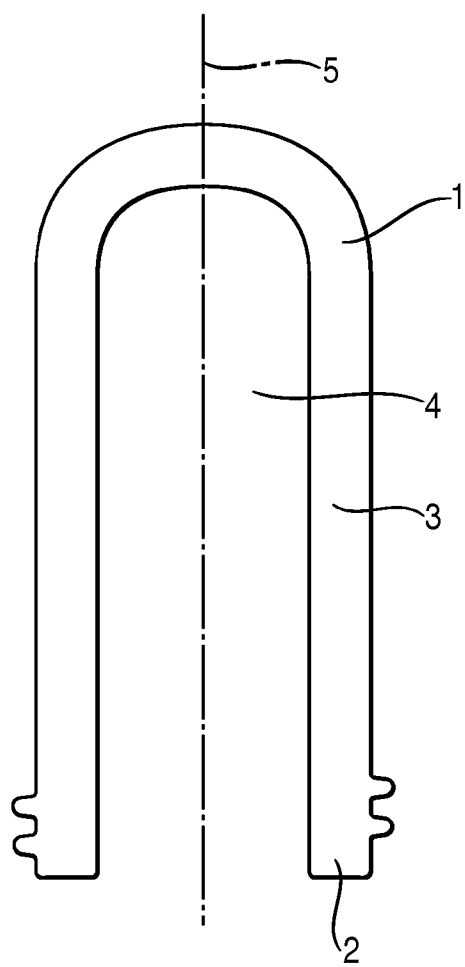
Figure 2:
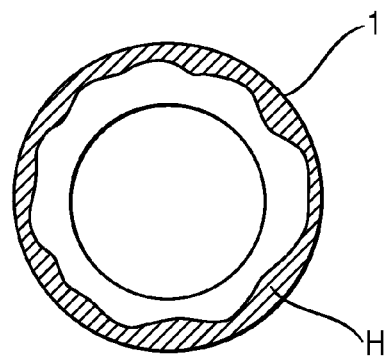
FIG. 2 shows the development of undesirable overheating in an outer region of a preform heated in a prior art technique.

FIG. 1 shows a transverse cross-section and a longitudinal cross-section through the body 3 of a preform 1. Such a preform 1, intended for use as a beverage container or bottle, already features a threaded neck 2, which, contrary to the body 3 of the preform 1, is usually not subjected to any heating and thus remains largely unaffected by the subsequent blow-moulding of the heated preform body 3. The cavity 4 of the preform 1 can be used to fixate the preform 1 during its path through the oven or furnace, as a bottle-blowing apparatus is usually termed, for example by a rod or pin upon which the preform is placed. While being heated, the preform may be rotated about its longitudinal axis 5. When heated in the oven, the body 3 of the preform 1 becomes hot and softens as a result, so that, in a subsequent treatment step, air forced into the cavity 4 of the preform 1 under a certain pressure causes the preform body 3 to expand. Suitable shaping means external to the preform 1 may serve to shape the beverage container, for example to give grooves or indentations for ease of holding of the container. In prior art halogen ovens, in which infrared radiation is emitted by a plurality of halogen light bulbs lining the walls of the oven, the preforms are heated essentially by thermal conduction from the outside to the inside. Because thermal conduction can be fairly slow, it is often a problem that the outer regions H of a preform become overheated by the time the inner regions are sufficiently warm for the subsequent blow-moulding step. This unwanted excessive heating is shown by the region H in the wall of the preform 1 in FIG. 2.

Figure 3:
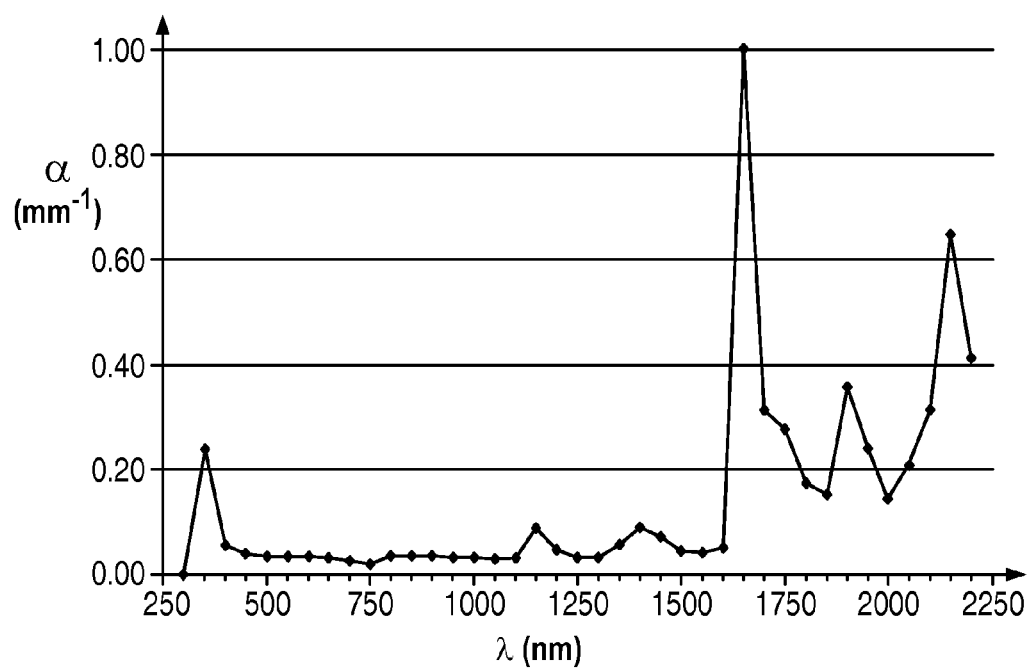
FIG. 3 shows a simplified absorption spectrum of an exemplary material used in manufacturing preforms.

FIG. 3 shows an absorption spectrum for a PET-material as it is typically used in the manufacture of preforms. The graph shows the absorption coefficient α (per mm) against wavelength λ (in nanometres). The peaks in the graph occurring at certain wavelengths—for example at approx. 1700 nm and 1900 nm—correspond to high absorption, so that radiation at those wavelengths is particularly well absorbed, so that the energy in the radiation at those wavelengths is converted to heat energy in the body of the preform. Radiation at other wavelengths, for example in the region between 400 nm and 1000 nm, effectively passes through the preform without being absorbed. The absorption coefficients at particular wavelengths can be determined experimentally, for example using the relationship $$\alpha_\lambda = -\frac{1}{t_m} \cdot \ln\left(\frac{I_\lambda}{I_0}\right) \tag{2}$$

in which $\alpha_\lambda$ is the absorption at wavelength λ, $I_0$ is the incoming radiation intensity (if the reflectivity of the material is non-negligible, the incoming intensity must be corrected accordingly), $I_\lambda$ is the transmitted intensity, and $t_m$ is the thickness of the test material. Such data is characteristic of the material and is usually supplied by the manufacturer or can be easily measured.

Figure 4:
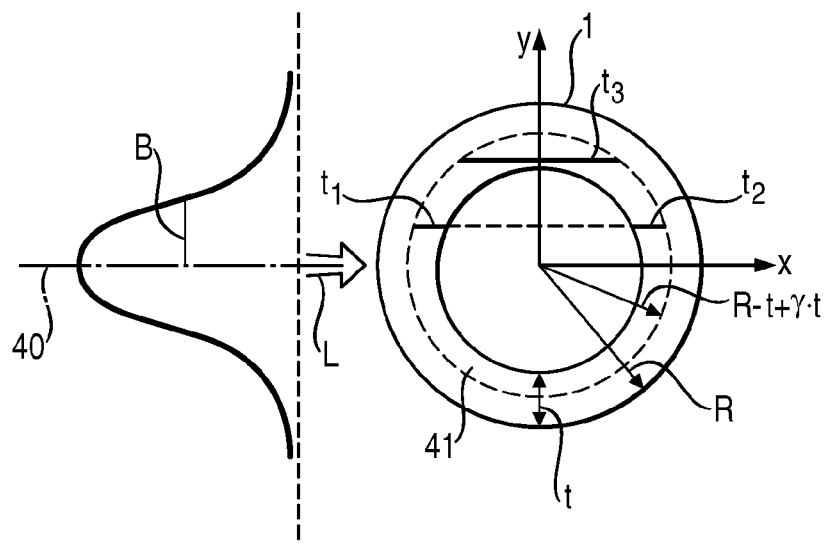
FIG. 4 shows an irradiance distribution of a laser radiation beam relative to a transverse cross section through a preform, indicating the paths taken by laser radiation through the preform when heated using the method according to the invention.

FIG. 4 illustrates the irradiance distribution of a laser radiation beam L directed at a preform 1 along a major axis 40 transverse to a longitudinal axis (not shown) of the preform 1. Here, the preform 1 is shown in transverse cross-section, with a radius R and a wall thickness t, with the centre of the preform 1 placed at the intersection of an x-axis and a y-axis. The z-axis is orthogonal to the plane given by the x- and y-axes, and corresponds to the longitudinal axis about which the preform 1 might be rotated while passing through the oven. The laser radiation L exhibits a normal or Gaussian distribution $I_{laser}(y, z)$ proportional to $\exp(-(y^2+z^2)/B^2)$, with an effective laser beam width B at which the intensity has dropped to a fraction 1/e of its maximum. Since only the radial dependence of the energy absorption density is relevant for the invention, the z-dependence of $I_{laser}$ will be neglected in the following considerations.

The paths $t_1$, $t_2$ and $t_3$ are exemplary laser radiation rays on their way through a layer in the preform wall within a radius r given by $$r = R - t + \gamma \cdot t \tag{3}$$

where $0 \leq \gamma \leq 1$. On its way through a material thickness Δt, the intensity of the laser radiation is reduced by a factor $e^{-\alpha \cdot \Delta t}$, leading to an additional dependency in the x-direction. To determine the total energy absorption $P^{(i)}$ in the annular region 41 of the preform 1 owing to the laser radiation absorbed along the paths $t_1$, $t_2$, an integral over the absorption density must be calculated, giving the following expression:

$$P^{(i)} = 2e^{-\alpha\left[\sqrt{R^2-y^2} - \sqrt{(R-t)^2-y^2}\right]} \cdot \sinh\left\{\alpha\left[\sqrt{(R-t+\gamma \cdot t)^2-y^2} - \sqrt{(R-t)^2-y^2}\right]\right\} \tag{3.1}$$

Similarly, for the path $t_3$ in the annular region 41, the total energy absorption $P^{(ii)}$ is given by $$P^{(ii)} = 2e^{-\alpha\left[\sqrt{R^2-y^2}\right]} \cdot \sinh\left\{\alpha\left[\sqrt{(R-t+\gamma \cdot t)^2-y^2}\right]\right\} \tag{3.2}$$

Integrating equation (3.1) from |y|=0 to R−t, and integrating equation (3.2) from |y|=R−t to R−t+γ·t, weighted with the in-plane Gaussian distribution $\exp(-y^2/B^2)$ of the laser radiation L, yields the following expression for energy absorption in a plane of a hollow cylinder with inner radius R−t and thickness γ·t:

$$P_{sum} = 2\int_0^{R-t} P^{(i)} e^{-\frac{y^2}{B^2}} dy + 2\int_{R-t}^{R-t+\gamma t} P^{(ii)} e^{-\frac{y^2}{B^2}} dy \tag{3.3}$$

Finally, $dP_{sum}/d\gamma$ must be calculated, since the absorption is a function of the depth within the preform wall. Because $P_{sum}$ is proportional to the integral P(r) of the absorption density from r=R−t to r=R−t+γ·t, it follows that, since $dP_{sum}/d\gamma = 2\pi r \cdot t \cdot P(r)$, $$P(r) = \frac{1}{\pi \cdot t \cdot (R-t+\gamma \cdot t)} \left\{ \int_0^{R-t} \frac{\partial P^{(i)}}{\partial \gamma} e^{-\frac{y^2}{B^2}} dy + \int_{R-t}^{R-t+\gamma \cdot t} \frac{\partial P^{(ii)}}{\partial \gamma} e^{-\frac{y^2}{B^2}} dy \right\} \tag{3.4}$$

As long as the ratio between energy absorption densities at the inside and outside is greater than 1, i.e.

$$\frac{P(r = R - t)}{P(r = R)} > 1 \tag{4}$$

the inside or inner region of the preform will be heated, as desired, to a relatively greater degree than the outside or outer region of the preform.

Figure 5:
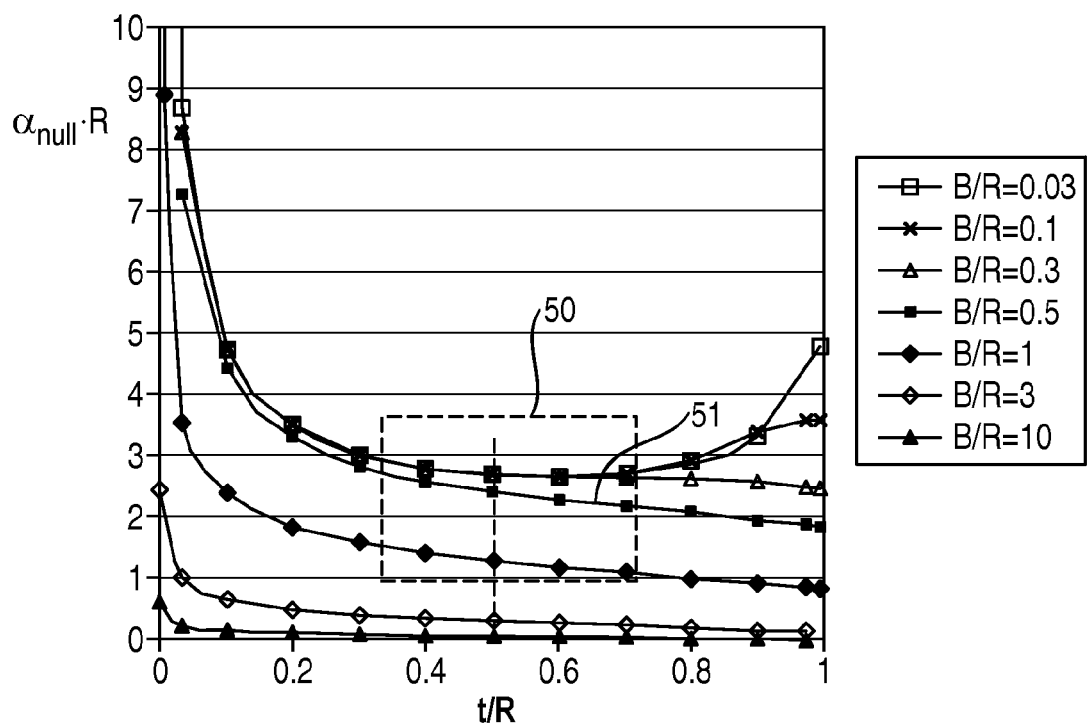
FIG. 5 shows a set of characteristic curves of relative effective absorption coefficients used in the method according to the invention.

Characteristic relative variables can be obtained by expressing certain descriptive parameters in terms of one common parameter. Here, the preform wall thickness t, the laser beam width B, and the absorption coefficient $\alpha_{eff}$ are combined with the preform outer radius R to give the following dimensionless combinations:

t/R relative preform thickness
B/R relative laser beam width, and
$\alpha_{\mathit{eff}}\cdot R$ relative effective absorption coefficient, For a variety of different preform geometries and laser beam widths, therefore, values of the relative effective absorption coefficient, for which $$\frac{P(r=R-t)}{P(r=R)} = 1 \quad (5)$$

is true, can be calculated and plotted to give a series of characteristic curves, as shown in FIG. 5. This figure shows a set of graphs of the relative effective absorption coefficient $\alpha_{null}\cdot R$, obtained such that condition (5) is satisfied, and for which the following applies (for a given preform-radius R):

$$\frac{P(r=R-t)}{P(r=R)} > 1 \text{ for } \alpha < \alpha_{null} \quad (6)$$

$$\frac{P(r=R-t)}{P(r=R)} < 1 \text{ for } \alpha < \alpha_{null}$$

The term "null" in context of $\alpha_{null}$ means that there is essentially no difference in energy absorption levels between an inside region and an outside region of the preform.

To verify the validity of the above calculations, the temperature gradient between the outside regions and the inside regions of a preform was measured for different values of the preform-characteristic geometrical parameter t/R and for different values of the relative laser-beam width B/R. These experimental measurements, obtained by pyrometry, gave a direct indication of the energy absorption densities P(r=R) and P(r=R−t) that matched the predicted values obtained using the above formulae.

On the basis of the characteristic curves of FIG. 5, it is possible to determine a realistic range within which the condition given by equation (4) is satisfied for a particular preform, since each curve represents a relative effective absorption coefficient $\alpha_{null}\cdot R$. An effective absorption coefficient $\alpha_{\mathit{eff}}$ chosen from 'below' a characteristic $\alpha_{null}\cdot R$ curve and used as the performance target for assembling a corresponding laser radiation beam—using equation (1) and equation (2) and the absorption spectrum for that material—will result in a stronger heating of the inner region of the preform. On the other hand, basing the laser radiation beam compilation on an effective absorption coefficient $\alpha_{\mathit{eff}}$ from 'above' the $\alpha_{null}\cdot R$ curve will result in a stronger heating of the outer region.

For example, consider a preform with a radius of 10 mm and a preform characteristic geometrical parameter t/R=0.5, i.e. the radius of the preform is twice as large as the wall thickness of the preform. This geometry corresponds to the dotted vertical line originating from the point 0.5 on the x-axis. A relative laser beam width B/R of 0.5, i.e. the laser beam is only half as wide as the preform, is associated with the characteristic $\alpha_{null}\cdot R$ curve 51, which intersects the dotted line at a value of about 2.4. With the preform radius of 10 mm, this gives an effective absorption coefficient $\alpha_{\mathit{eff}}$ of about 0.24, which can be used as the target for which wavelengths and intensities are chosen to satisfy equation (1). Real values for the absorption coefficients to substitute in place of $\alpha_\lambda$ (for the selected laser wavelengths $\lambda_1, \lambda_2, \ldots, \lambda_n$) are deduced from the absorption spectrum of the preform material. Weighting factors $w_1, w_2, \ldots, w_n$, with a combined total of 1.0, are chosen such that the entire sum (or integral, as appropriate) in equation (1) yields the chosen value of $\alpha_{\mathit{eff}}$.

With this value of effective absorption coefficient $\alpha_{\mathit{eff}}$, chosen from the intersection on the characteristic $\alpha_{null}\cdot R$ curve 51, an even heating of the preform can be ensured. On the other hand, if it is desired to heat the inner surfaces of the preform to a greater extent than the outer surfaces, a relative effective absorption coefficient $\alpha_{\mathit{eff}}\cdot R$ should be chosen from below the characteristic $\alpha_{null}\cdot R$ curve 51, for example a value of 2.0, giving an effective absorption coefficient $\alpha_{\mathit{eff}}$ of 0.2 for our example. By using this value of effective absorption coefficient as a target for which to compile the laser radiation beam, the desired temperature profile is obtained. Equally, a heating profile in which the outer regions are heated to a greater extent than the inner regions can be obtained by choosing a relative effective absorption coefficient $\alpha_{\mathit{eff}}\cdot R$ from above the characteristic $\alpha_{null}\cdot R$ curve 51, for example a value of 3.0, giving an effective absorption coefficient $\alpha_{\mathit{eff}}$ of 0.3, which is then used in equation (1) as a target for which to determine the desired wavelengths and to chose the appropriate intensities. In most practical cases, since preform geometries are rarely extreme, i.e. the wall thickness of a preform is rarely very thin or very thick relative to the radius, and since a laser beam width is usually neither very wide nor very point-shaped, a favourable relative effective absorption coefficient $\alpha_{\mathit{eff}}\cdot R$ and a practicable relative beam width B/R can be chosen from within the rectangle 50 enclosed by the dotted line.

As mentioned already, the method according to the invention allows a favourably higher temperature to be reached at the inner preform region compared to the outer preform region. In the following, a number of measures are described which can be implemented if it is judged expedient to limit or reduce the level of heating at the inner preform regions.

Figure 6A:
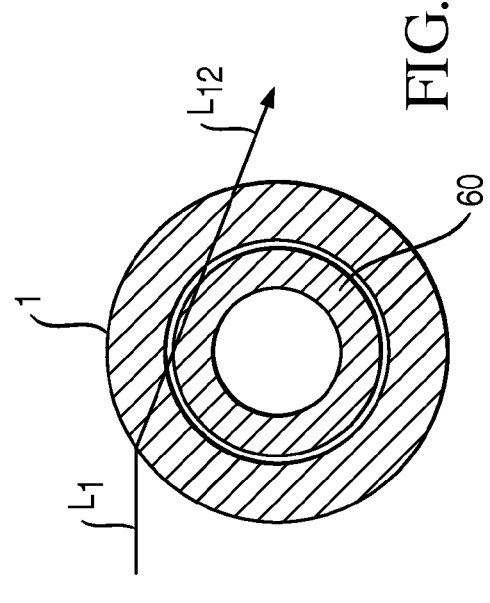
FIG. 6a shows a cross-section through a preform and the paths taken by two exemplary radiation rays through the preform.

FIG. 6a shows a hollow preform 1 and two exemplary incident rays $L_1$, $L_2$ of laser radiation. A first ray $L_1$ enters the wall of the preform 1 and undergoes total internal reflection (TIR) at the inner preform/air interface, before exiting the preform 1 as a refracted ray $L_{11}$. A second ray $L_2$ enters the wall of the preform 1 and undergoes refraction while passing through the wall, the cavity 4, and the wall again before exiting the preform 1 as a refracted ray $L_{21}$. As the diagram shows, the effective path length inside the material may become relatively long, but also spatially concentrated for rays undergoing TIR, resulting in an increased absorption within a region $H_1$. This region $H_1$ may therefore become somewhat too hot. To ensure that the temperature at the inner surface or region of the preform does not become too high during a heating process according to the invention, even if the desired temperature profile specifies that the preform should be 'hotter on the inside', a suitable element can be inserted into the cavity of the preform to prevent overheating. In the following diagrams, for the sake of clarity, a distinct gap is shown between the additional element and the preform, but in practice the element could be designed to closely or exactly fit the cavity.

Figure 6C:
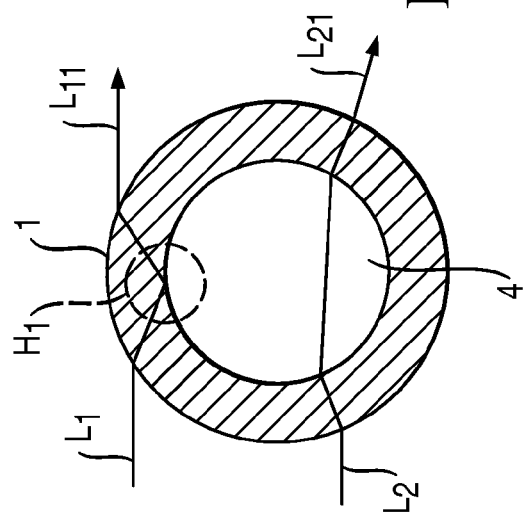
FIG. 6c shows a cross-section through a preform and a first thermal absorber for absorbing laser radiation in a preform heating method according to the invention.
Figure 6B:
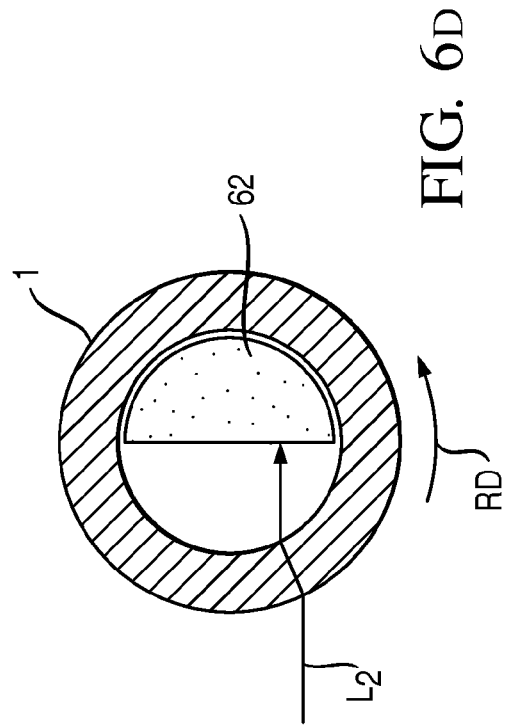
FIG. 6b shows a cross-section through a preform and a refractive element for refracting laser radiation in a preform heating method according to the invention.

FIG. 6b shows a cross-section through a preform 1 in which a refractive element 60 has been inserted into the cavity. Here, the refractive element 60 is chosen for its favourable refractive index, which is close to or identical to that of the preform 1. For instance, the refractive element 60 can be of the same material as the preform 1, and can be formed to essentially exactly fit the cavity of the preform 1. In this way, a ray $L_1$ entering the preform will not undergo TIR as was the case in FIG. 6a, but will pass through the refractive element 60 (losing some of its energy on the way) before re-entering the preform wall at a distance further away and then exiting the preform as the refracted ray $L_{12}$.

Figure 6D:
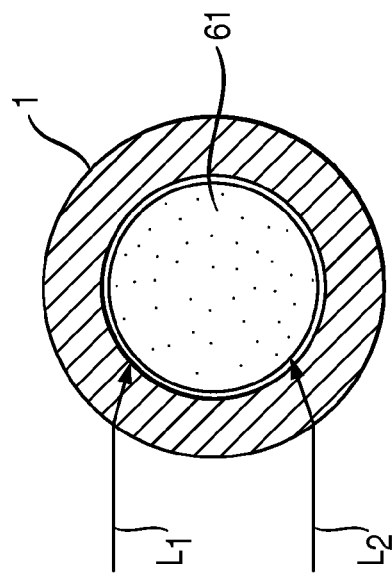
FIG. 6d shows a cross-section through a preform and a second thermal absorber for absorbing laser radiation in a preform heating method according to the invention.

In another approach to suppress 'excess' absorption in the inner regions of a preform, instead of redirecting the laser radiation rays, the excess energy of the rays can be absorbed by a suitable thermal absorber placed within the cavity of the preform 1. FIG. 6c shows a preform 1 containing such a thermal absorber 61. The radiation rays $L_1$, $L_2$ pass through the wall of the preform 1 before arriving at the thermal absorber 61, where their energy is absorbed so that these rays are effectively 'terminated' by the absorber 61. FIG. 6d shows a preform 1 with a refractive element 62 that only occupies about half of the cavity. This might be more economical, particularly if only the preform—and not the absorber 62—is rotated, for example in the direction RD shown, while passing through the oven. A radiation ray $L_2$ that passes through the wall of the preform 1 and enters the cavity 4 will strike the flat face of the thermal absorber 62 and be terminated. The thermal absorber 61, 62 can be any suitable material, even water. For example, if a preform is suspended with its neck end or opening facing upward, the cavity 4 can simply be filled with water before the preform enters the oven.

Figure 7:
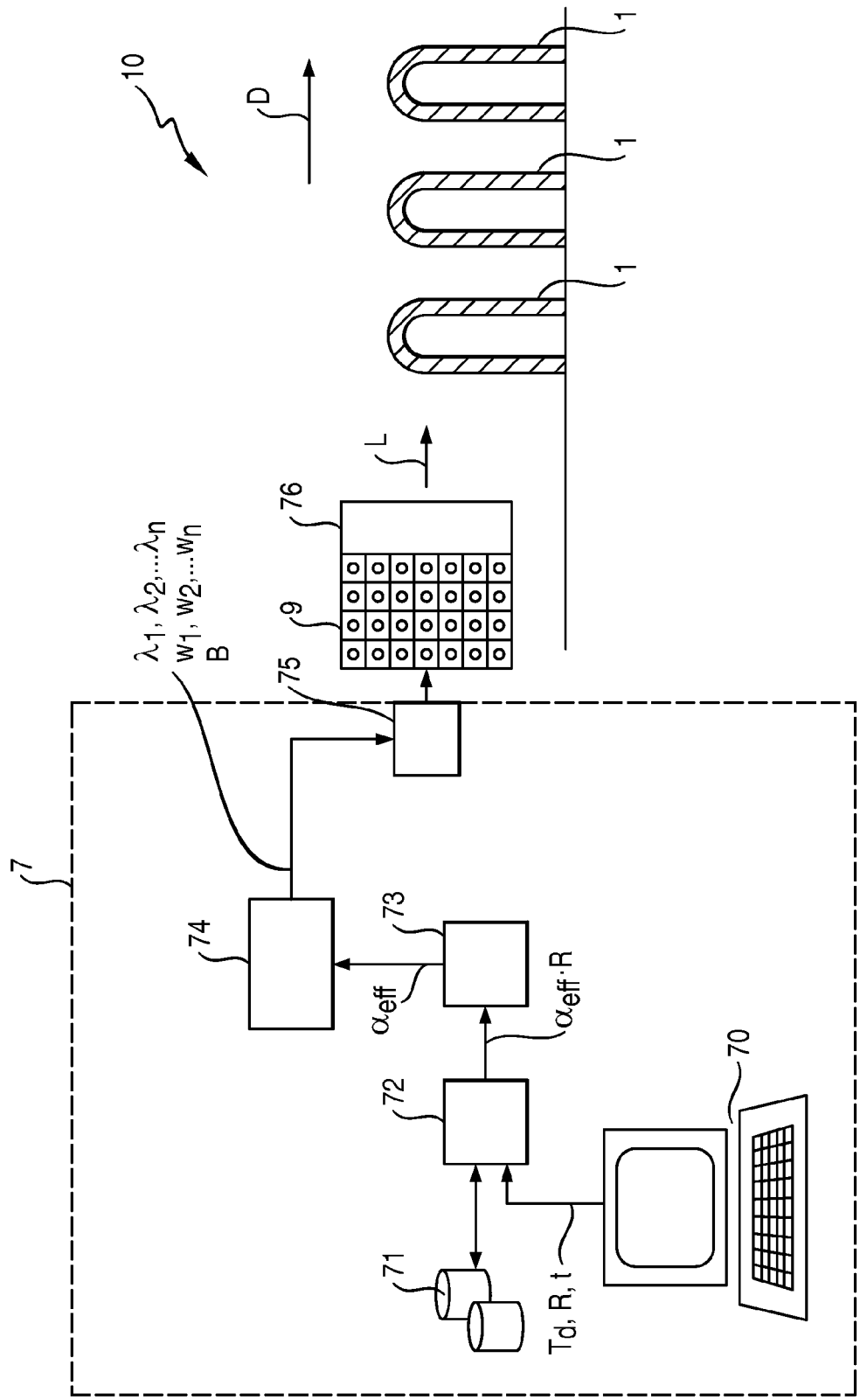
FIG. 7 shows a bottle-blowing apparatus including a driving arrangement according to an embodiment of the invention.

FIG. 7 shows a block diagram of a preform heating system 10 using a driving arrangement 7 according to the invention. The driving arrangement 7 comprises an input interface 70 for inputting preform geometry parameters, for example preform radius R and wall thickness t. A system controller could enter these parameters manually through a keyboard, for example, or cause them to be retrieved from a database 71 of previously stored information. Further parameters such as data describing the absorption spectrum of the preform-material (if the material type is known), and a desired temperature profile $T_d$ for the preform to be heated could also be entered manually or retrieved from the database 71. The parameters can be supplied as suitable digital input. A selection module 72 selects or determines a relative effective absorption coefficient $\alpha_{eff}R$ on the basis of the preform parameters and the desired temperature profile. Again, information describing the feasible relative effective absorption coefficients can be retrieved from a database 71 or memory 71. A derivation module 73 derives an effective absorption coefficient $\alpha_{eff}$ from the relative effective absorption coefficient $\alpha_{eff}R$, and a laser parameter compiler module 74 compiles a wavelength spectrum with a number of laser wavelengths $\lambda_1$, $\lambda_2$, ..., $\lambda_n$. The intensity of each laser radiation component is defined by weighting factors $w_1$, $w_2$, $w_n$, chosen by the laser parameter compiler module 74 to satisfy the effective absorption coefficient $\alpha_{eff}$, according to equation (1), on the basis of the corresponding absorption coefficients of the absorption spectrum of the preform material. The laser parameter compiler module 74 also determines a laser beam width B on the basis of the desired or achievable relative effective absorption coefficient $\alpha_{eff}R$. A laser control unit 75, acting as an output interface 75 between the driving unit 7 and the laser radiation generation unit 9, converts the chosen laser radiation wavelengths $\lambda_1, \lambda_2, \ldots, \lambda_n$, weighting factors $w_1, w_2, \ldots, w_n$, and beam width B into suitable control signals for the laser radiation generator 9 and a beam shaper 76. The laser radiation generator 9, in this case a bank of VCSELs, is driven to generate laser radiation at the desired wavelengths $\lambda_1$, $\lambda_2, \ldots, \lambda_n$ and with the desired intensities, and the beam shaper 76 shapes the radiation output by the VCSELs to give a laser radiation beam L at the desired beam width B, and directs the laser radiation beam L at a series of preforms 1 as they are transported in a direction D through an oven of the preform heating system 10. For the sake of simplicity, the laser radiation L is represented by an arrow, but the skilled person will know that the laser radiation can be emitted from the beam shaper 76 as a 'slice' or 'wedge' as high as the bank of VCSELs and as broad as determined by the laser beam width B. Modules such as the selection module 72, derivation module 73, and laser parameter compiler module 74 have been shown as distinct units, and together comprise a configuration arrangement for the laser radiation generating unit 9, but it will be clear to the skilled person that these modules can easily be realised as software modules or hardware modules and can be combined as desired.

Figure 8A:
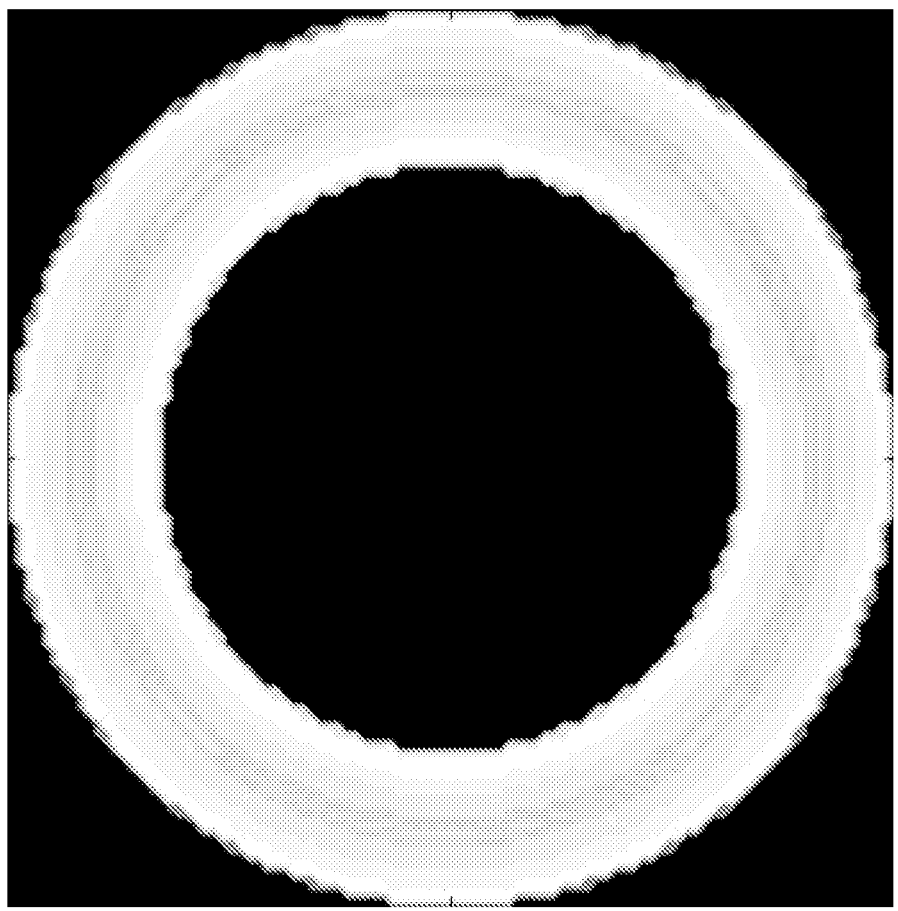
FIG. 8a shows a ray-tracing simulation for a preform cross-section and a first heating profile using the method according to the invention.

FIG. 8a shows a ray-tracing simulation for a preform cross-section and a first heating profile using the method according to the invention. Dark areas represent areas of poor energy absorption, while light areas represent areas of high absorption. The simulation shows the effect of heating a preform using a laser beam chosen according to a desired temperature profile to give an essentially homogenous or even energy absorption density throughout the body of the preform. As can be seen in the image, the energy deposition would be fairly evenly distributed throughout the preform.

Figure 8B:
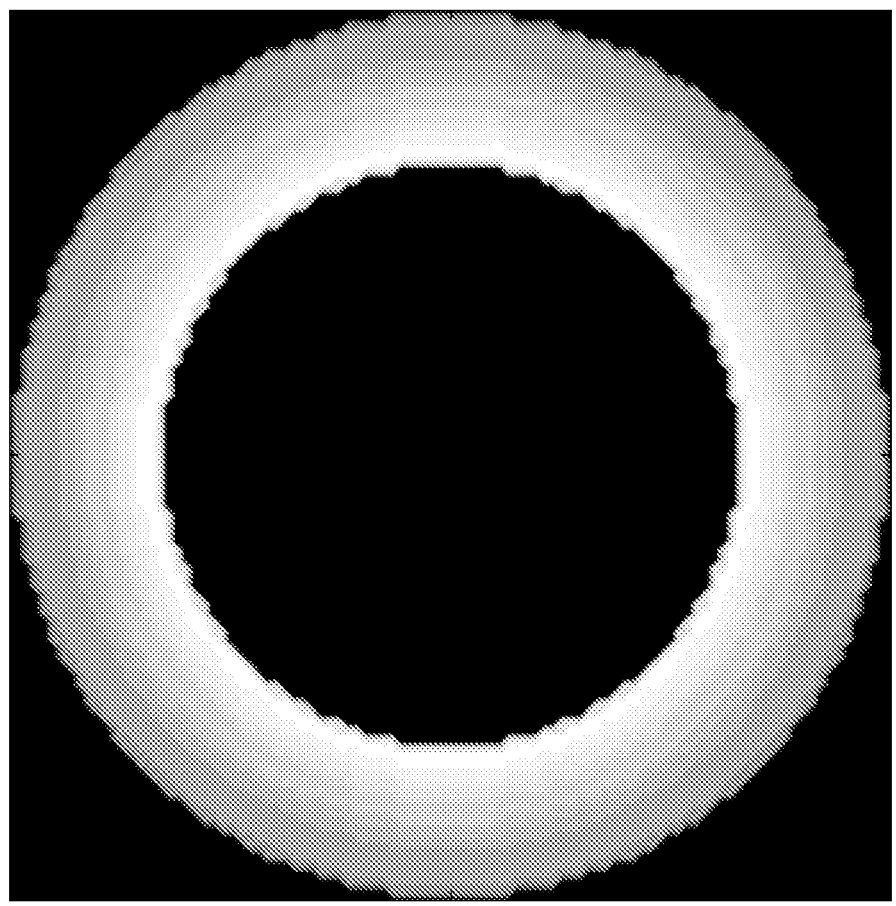
FIG. 8b shows a ray-tracing simulation for a preform cross-section and a second heating profile using the method according to the invention.

FIG. 8b shows a ray-tracing simulation for a preform cross-section and a second heating profile, in this case according to a heating profile to give a higher energy absorption density in the inner region of the preform, and a lower energy absorption density in the outer region of the preform. The image shows that the energy deposition would be significantly higher in the inner regions of the preform. Heating the preform in this way can result in improvements in a subsequent stretch blow-moulding stage.

Although the present invention has been disclosed in the form of a number of preferred embodiments, it is to be understood that additional modifications or variations could be made to the described embodiments without departing from the scope of the invention. For example, the preform heating system shown in the diagram could also include a number of halogen lamps for providing a 'basic' thermal irradiation, and the laser radiation source can then be used to specifically enhance selected portions of the radiation spectrum (i.e., increase the weighting factors $w_i$ at the laser-wavelengths $\lambda_1$, $\lambda_2, \ldots, \lambda_n$) to achieve a desired temperature profile, e.g. to more strongly heat the inner regions of the preform.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A preform heating system for heating a preform characterized by a radius, material thickness, and an absorption spectrum of the preform material, which system comprises:
   a driving arrangement for compiling a laser radiation wavelength spectrum comprising a number of laser radiation wavelengths $(\lambda_1, \lambda_2, \ldots, \lambda_n)$, and for selecting a desire laser beam width;
   a laser radiation generating unit for generating laser radiation according to the laser radiation wavelength spectrum; and
   a beam shaping unit for shaping the laser radiation according to the desired beam width and for directing the shaped laser radiation beam at the preform to heat the preform;
   wherein said driving arrangement comprises:
      an input interface for obtaining preform geometry parameters (R,t), a preform absorption spectrum, and a desired temperature profile ($T_d$) for the preform;
      a selection arrangement for selecting, depending on the desired temperature profile ($T_d$), an effective absorption coefficient ($\alpha_{eff}$) on the basis of the preform geometry parameters (R, t);

a laser parameter compiler module for compiling a laser radiation wavelength spectrum on the basis of absorption coefficients ($\alpha_\lambda$) of the absorption spectrum to approximate the effective absorption coefficient ($\alpha_{eff}$), and for selecting a laser beam width for the laser radiation beam on the basis of a relative effective absorption coefficient ($\alpha_{eff} \cdot R$), the relative effective absorption coefficient ($\alpha_{eff} \cdot R$) being in the range 1.0 to 4.0, wherein said spectrum comprises a plurality of laser components having different wavelengths and wherein the laser radiation beam comprises a wavelength spectrum compiled on the basis of the absorption spectrum to satisfy an effective absorption coefficient ($\alpha_{eff}$) derived from the relative effective absorption coefficient ($\alpha_{eff} \cdot R$); and an output interface for providing the laser radiation generating unit with control signals pertaining to the compiled laser radiation wavelength spectrum and the laser beam width.

2. A preform heating system according to claim 1, wherein the selection arrangement comprises a selection module for selecting a relative effective absorption coefficient ($\alpha_{eff} \cdot R$) on the basis of the preform geometry parameters and the desired temperature profile ($T_d$), and a derivation module for deriving the effective absorption coefficient ($\alpha_{eff}$) from the relative effective absorption coefficient ($\alpha_{eff} \cdot R$).

3. A preform heating system according to claim 1, wherein the laser radiation generating unit comprises a plurality of vertical cavity surface emitting lasers.

4. A preform heating system according to claim 1, comprising an additional infrared radiation source.

5. A preform heating system according to claim 1, further comprising a configuring arrangement for configuring the laser radiation generating unit to generate a laser radiation beam for heating the preform according to a desired relative effective absorption coefficient ($\alpha_{eff} \cdot R$) in the range 2.0 to 3.5.

6. A preform heating system according to claim 1, further comprising a configuring arrangement for configuring the laser radiation generating unit to generate a laser radiation beam for heating the preform according to a desired relative effective absorption coefficient ($\alpha_{eff} \cdot R$) in the range 2.5 to 3.0.

7. A preform heating system according to claim 1, wherein the heating preform comprises an interior space and a refractive element is provided in the interior space prior to heating the preform.

8. A preform heating system according to claim 1, wherein the heating preform comprises an interior space and a thermal absorber substance is provided in the interior space prior to heating the preform.

9. A preform heating system according to claim 1, wherein the effective absorption coefficient ($\alpha_{eff}$) for a given radiation spectrum is determined by the equation:

$$\alpha_{eff} = -\frac{1}{t} \cdot \ln\left[\sum_\lambda w_\lambda \cdot \exp(-\alpha_\lambda \cdot t)\right]$$

where t is the thickness, $\lambda$ is a wavelength of a laser radiation component, $\alpha_\lambda$ is an absorption coefficient for that material at that wavelength, and $w_\lambda$ is a weighting factor for that wavelength.

* * * * *